United States Patent
Yu et al.

(10) Patent No.: US 8,965,801 B2
(45) Date of Patent: Feb. 24, 2015

(54) PROVISION OF SUPPORT SERVICES AS A SERVICE

(75) Inventors: Deng Yu, Yorktown Heights, NY (US); Michael Reuben Head, Tarrytown, NY (US); Andrzej Kochut, Elmsford, NY (US); Jonathan Paul Munson, Putnam Valley, NY (US); Anca Sailer, Scarsdale, NY (US); Hidayatullah Habeebullah Shaikh, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 12/751,559

(22) Filed: Mar. 31, 2010

(65) Prior Publication Data

US 2011/0246253 A1 Oct. 6, 2011

(51) Int. Cl.
| | | |
|---|---|---|
| G06Q 10/00 | (2012.01) | |
| G06F 17/30 | (2006.01) | |
| H04W 12/02 | (2009.01) | |
| G06Q 10/06 | (2012.01) | |
| G06Q 30/04 | (2012.01) | |
| G06Q 30/06 | (2012.01) | |
| G06Q 50/18 | (2012.01) | |

(Continued)

(52) U.S. Cl.
CPC .......... *G06Q 10/00* (2013.01); *G06F 17/30566* (2013.01); *H04W 12/02* (2013.01); *G06Q 10/0631* (2013.01); *G06Q 10/06311* (2013.01); *G06Q 10/067* (2013.01); *G06Q 30/04* (2013.01); *G06Q 30/0603* (2013.01); *G06Q 50/18* (2013.01); *G06F 17/30545* (2013.01);

*H04W 12/06* (2013.01); *H04L 63/061* (2013.01); *H04L 12/2602* (2013.01)
USPC .............. 705/34; 705/42; 709/223; 709/224; 709/225; 455/432.2; 715/208

(58) Field of Classification Search
None
See application file for complete search history.

(56) References Cited

U.S. PATENT DOCUMENTS

| | | | | |
|---|---|---|---|---|
| 5,870,717 | A | | 2/1999 | Wiecha |
| 5,903,643 | A | * | 5/1999 | Bruhnke .................. 379/413.04 |

(Continued)

OTHER PUBLICATIONS

Papazoglou, Mike P. "Service-oriented computing: Concepts, characteristics and directions." Web Information Systems Engineering, 2003. WISE 2003. Proceedings of the Fourth International Conference on. IEEE, 2003.*

(Continued)

*Primary Examiner* — Gurkanwaljit Singh
(74) *Attorney, Agent, or Firm* — Louis J. Percello; Ryan, Mason & Lewis, LLP (57) ABSTRACT

A method of providing support services as a service is presented. For example, the method includes providing to a service provider one or more service modules operative to provide the support services to the service provider. The one or more service modules are provided by one or more suppliers of the support services and include instruction code operative to be performed on a processor device and one or more application programming interfaces operative for programmatic access to the one or more service module. The service modules may further include one or more user interfaces operative for interactive access to a respective service module. The one or more service modules may include, for example, one or more of a profile service module, an offering service module, a customer service module, a process service module, a user interface service module and a revenue service module.

25 Claims, 6 Drawing Sheets

(51) Int. Cl.
  *H04W 12/06* (2009.01)
  *H04L 29/06* (2006.01)
  *H04L 12/26* (2006.01)

(56) References Cited

U.S. PATENT DOCUMENTS

| | | | |
|---|---|---|---|
| 6,459,702 | B1 | 10/2002 | Saaverda et al. |
| 6,538,998 | B1 | 3/2003 | Garimella |
| 6,914,973 | B2* | 7/2005 | Marsico .................. 379/221.13 |
| 7,058,716 | B1 | 6/2006 | Sundaresan et al. |
| 7,114,146 | B2 | 9/2006 | Zhang et al. |
| 7,281,046 | B1 | 10/2007 | Sunderasan et al. |
| 7,496,652 | B2 | 2/2009 | Pezzutti |
| 7,502,850 | B2 | 3/2009 | Fellenstein et al. |
| 7,941,804 | B1 | 5/2011 | Herington et al. |
| 8,019,066 | B1* | 9/2011 | Efrati et al. ............. 379/201.02 |
| 8,234,387 | B2* | 7/2012 | Bradley et al. ................ 709/229 |
| 8,538,895 | B2* | 9/2013 | Appelman et al. ............ 705/319 |
| 2001/0027470 | A1* | 10/2001 | Ulmer et al. .................. 709/203 |
| 2002/0010724 | A1* | 1/2002 | Sterling et al. ................ 707/530 |
| 2002/0091533 | A1 | 7/2002 | Ims et al. |
| 2002/0101881 | A1 | 8/2002 | Sundaresan et al. |
| 2002/0116638 | A1* | 8/2002 | Dobes et al. .................. 713/201 |
| 2002/0156733 | A1* | 10/2002 | Shimada et al. ................ 705/42 |
| 2002/0184405 | A1* | 12/2002 | Omori et al. .................. 709/318 |
| 2003/0120502 | A1* | 6/2003 | Robb et al. ......................... 705/1 |
| 2004/0162741 | A1 | 8/2004 | Flaxer et al. |
| 2004/0186903 | A1* | 9/2004 | Lambertz ...................... 709/224 |
| 2004/0267627 | A1* | 12/2004 | Rippingale et al. ............. 705/26 |
| 2005/0066272 | A1* | 3/2005 | Sterling et al. ................ 715/513 |
| 2006/0050862 | A1 | 3/2006 | Shen et al. |
| 2007/0072605 | A1* | 3/2007 | Poczo ........................ 455/432.2 |
| 2007/0143457 | A1 | 6/2007 | Mao et al. |
| 2007/0294762 | A1* | 12/2007 | Shraim et al. ................... 726/22 |
| 2007/0297350 | A1 | 12/2007 | Eilam et al. |
| 2008/0021799 | A1* | 1/2008 | Blowers ........................... 705/30 |
| 2008/0040281 | A1 | 2/2008 | Chakraborty et al. |
| 2008/0281904 | A1* | 11/2008 | Conrad et al. ................ 709/203 |
| 2009/0183168 | A1 | 7/2009 | Uchida |
| 2011/0119530 | A1 | 5/2011 | Lazzaro |
| 2011/0145365 | A1* | 6/2011 | Beattie et al. ................. 709/219 |

OTHER PUBLICATIONS

Tao, Lixin. "Shifting paradigms with the application service provider model."Computer 34.10 (2001): 32-39.*

Leavitt, Neal. "Is Cloud Computing Really Ready for Prime Time?." Growth 27 (2009): 5.*

Feamster, Nick, Lixin Gao, and Jennifer Rexford. "How to lease the Internet in your spare time." ACM SIGCOMM Computer Communication Review 37.1 (2007): 61-64.*

Lawton, George. "Developing software online with platform-as-a-service technology." Computer 41.6 (2008): 13-15.*

Xie, Haiyong, et al. "P4P: Provider portal for applications." ACM SIGCOMM Computer Communication Review. vol. 38. No. 4. ACM, 2008.*

Foster, Ian, et al. "Grid services for distributed system integration." Computer35.6 (2002): 37-46.*

T Ograph, B., and Y. Richard Morgens. "Cloud computing."Communications of the ACM 51.7 (2008).*

Tsai, Wei-Tek, Xin Sun, and Janaka Balasooriya. "Service-oriented cloud computing architecture." Information Technology: New Generations (ITNG), 2010 Seventh International Conference on. IEEE, 2010.*

L. Li et al, "E-Business Process Modeling with Finite State Machine Based Service Agents," CSCWD, 2008, pp. 261-272.

Y. Zhou et al, "Reasoning Over Ontologies of On Demand Service," Proceedings of the 2005 IEEE International Conference on e-Technology, e-Commerce and e-Service (EEE'05) on e-Technology, e-Commerce and e-Service, 2005, 4 pages.

P. Mell et al., "Cloud Computing Definition," National Institute of Standards and Technology, Version 15, Oct. 2009, 2 pages.

* cited by examiner

PROVISION OF SUPPORT SERVICES AS A SERVICE

FIELD OF THE INVENTION

The present invention relates generally to support services and, more particularly, to providing support services such as, for example, business support services as a service to a service provider.

BACKGROUND OF THE INVENTION

Web or Internet delivery of computing services hosted in centralized data centers (e.g., "cloud" offerings) is becoming an increasingly popular way to offer information services.

Service providers formulate service offerings and provide services to customers. Exemplary services and associated service providers for delivery of cloud computing services or related information service offerings include computing services provided by a cloud platform computing service provider and Internet access provided by an Internet service provider. Other exemplary services offered by corresponding service providers may include personal or business communications provided by a telecommunications service provider and cellular phone service provided by a cellular service provider. Cellular phone services may include, for example, voice service, video services and text messaging services.

Business support services (BSS) are business related services necessary or desirable for the functioning of a business. BSS may include, for example, business support services related to providing computing and information services. Such BSS may include, for example, services for enrollment, subscription and service configuration. BSS may be employed by, for example, a cloud computing service provider in order to provide cloud computing services to customers.

SUMMARY OF THE INVENTION

Principles of the invention provide, for example, methods, apparatus and systems for providing support services.

In accordance with a first aspect of the invention, a method of providing support services as a service comprises providing to a service provider one or more service modules operative to provide the support services to the service provider. The one or more service modules comprise one or more application programming interfaces operative for programmatic access to the one or more service modules. The one or more service modules are provided by one or more suppliers of the support services. Provision of the one or more service modules is implemented by instruction code operative to be executed on a processor device.

In accordance with a second aspect of the invention, a system for providing support services as a service is provided. The system comprises modules for implementing the above method.

In accordance with a third aspect of the invention, apparatus for providing support services as a service is provided. The apparatus includes a memory and a processor coupled to the memory. The apparatus is configured to perform the above method.

In accordance with a fourth aspect of the invention, an article of manufacture for providing support services as a service is provided. The article of manufacture comprises a computer readable storage medium tangibly embodying a computer readable program code which, when executed, causes the computer to carry out the above method.

In accordance with a fifth aspect of the invention, each of the one or more service modules comprises one or more user interfaces operative for interactive access to a respective service module of the one or more service modules.

In accordance with a sixth aspect of the invention, the one or more service modules comprise one or more of a profile service module, an offering service module, a customer service module, a process service module, a user interface service module and a revenue service module.

Advantageously, principles of the invention provide, for example, cost effective and efficient methods and systems for a service provider to obtain and manage support services. A service provider functions to provide the support services to other service providers.

These and other features, objects and advantages of the present invention will become apparent from the following detailed description of illustrative embodiments thereof, which is to be read in connection with the accompanying drawings.

DETAILED DESCRIPTION OF THE INVENTION

Principles of the present invention will be described herein in the context of illustrative embodiments of methods, apparatus and systems for providing business support services as a service. It is to be appreciated, however, that the principles of the present invention are not limited to the specific apparatus, systems, methods, or types of support services illustratively shown and described herein. Rather, the principles of the invention are directed broadly to techniques related to providing support services. For this reason, numerous modifications can be made to the embodiments shown that are within the scope of the present invention. That is, no limitations with respect to the specific embodiments described herein are intended or should be inferred.

For example, principles of the invention may apply to an "enterprise." As used herein, the term "enterprise" is understood to broadly refer to any entity that is created or formed to achieve some purpose, examples of which include, but are not limited to, an undertaking, an endeavor, a venture, a business, a concern, a corporation, an establishment, a firm, an organization, or the like. While illustrative embodiments of the invention may refer to a "business," it is understood that a "business" is only one example of an enterprise, and principles of the invention apply more generally to enterprises.

Information and/or computing services are offered and provided by, for example, a cloud computing resource service provider. Customer self-service for enrollment, subscription, service configuration and other related business functions may be a significant feature for cost-effective delivery of cloud offerings. Such functions may be grouped together and known as Business Support Services (BSS). Business Support Services (BSS) may be delivered through the Web or Internet computing services and hosted in one or more centralized data centers (e.g., one or more compute clouds).

The term "cloud computing" is typically defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction, see, Cloud Computing Definition, National Institute of Standards and Technology, Version 15, October 2009, the disclosure of which is incorporated by reference herein. However, it is to be understood that principles of the invention are not intended to be limited to this particular definition of cloud computing, and that other suitable computing environments are contemplated as being within the scope of the invention.

While BSS are vital functions for service providers (e.g., Internet service provider, computing service provider or providers of other services to the public), BSS may be considered as overhead operations are not seen as differentiating a service provider from competitors. Thus, it is important to reduce the cost of providing BSS for a cloud offering.

From a customer perspective, BSS may also be regarded as overhead because BSS is a set of functions interposed between customers and an end service that is using the BSS. For each end service, customers may have a separate BSS system to interact with. Thus, the customer may have separate user accounts, separate bills and/or separate account management for each end service.

Embodiments of the invention advantageously address the above problems by providing BSS as a service. Providing BSS as a service is herein known as BSS-as-a-Service or simply BaaS. A service provider provides BaaS to, for example, other service providers (e.g., cloud computing service provider, other information or computing service providers and end service providers). A service provider providing BaaS is herein termed a BSS service provider (BSSSP). To differentiate between a BSSSP and a service provider who is supplied BSS by the BSSSP, the service provider who is supplied the BSS services is henceforth herein referred to as a service provider and the supplier of the BSS is henceforth herein referred to as a BSSSP and will not henceforth herein be known by the unmodified term of "service provider." In order to implement such a service, BSS-related logic is used.

Figure 1:
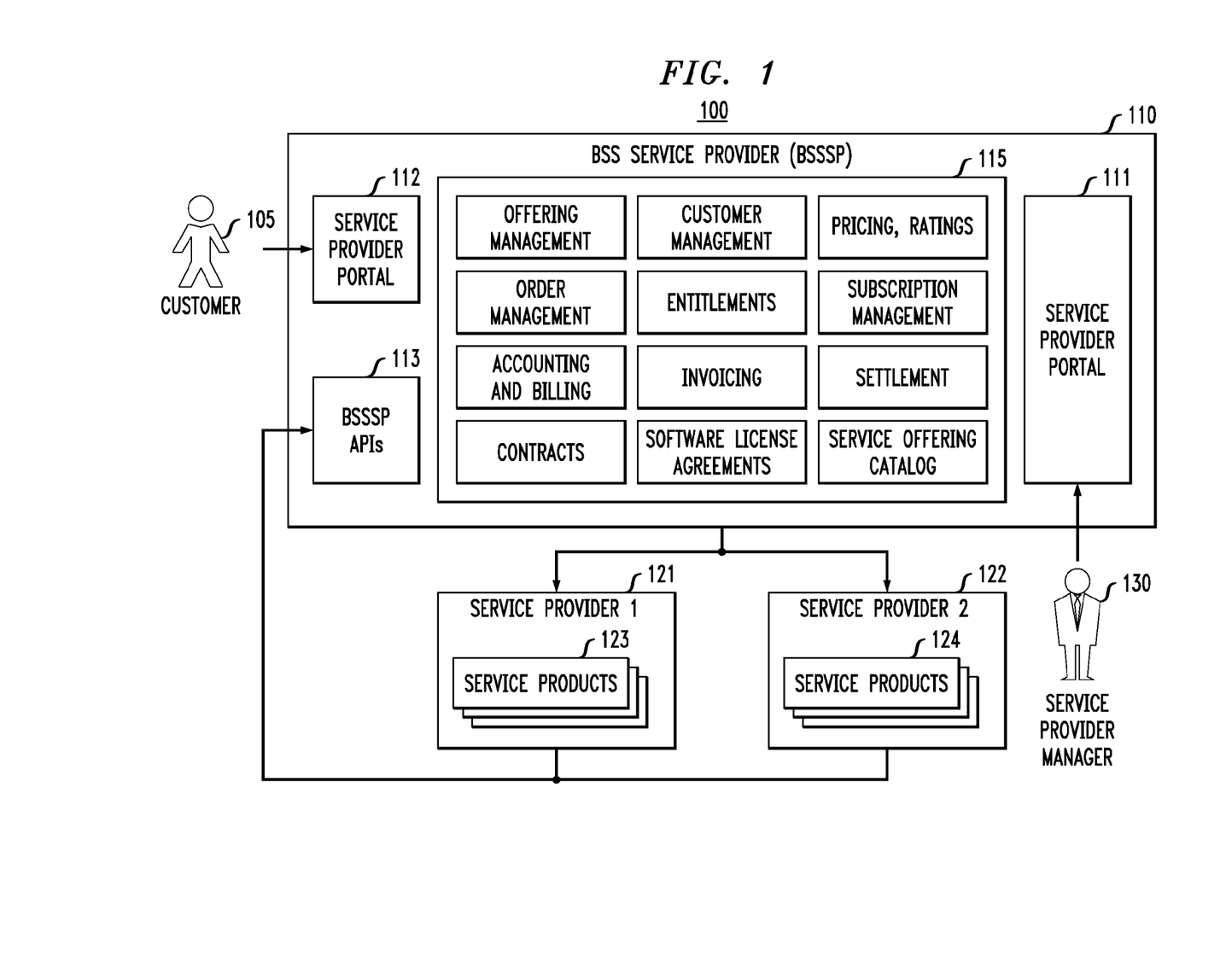
FIG. 1 illustrates a diagram of a system for providing support services as a service according to an embodiment of the invention.

FIG. 1 is a diagram of a system 100 for providing BSS as a service according to an embodiment of the invention. The system 100 comprises BSSSP 110 coupled to a first service provider 121 and a second service provider 122. The BSSSP 110 comprises BSS 115, a service provider portal 111, a service customer portal 112 and BSSSP application programming interfaces (APIs) 113. The first service provider 121 offers and provides service products 123 to one or more customers 110 of the first service provider 121. The second service provider 122 offers and provides service products 124 to one or more customers 110 of the second service provider 122. The service providers 121 and 122 have access to the BSSSP 110 through the service provider portal 111 in order to adapt, form and/or obtain the BSS. For example, a service provider manager 130 has access to the BSSP 110. The service providers 121 and 122 use APIs 113 for programmatic access to one or more functions of service modules of the BSSSP. Customers have access to the BSSSP, at least in part, through a service customer portal 112. Exemplary BSS 115 comprise offering management, order management, accounting and billing, services associated with contracts, customer management, services associated with entitlements, invoicing, services associated with software license agreements, services associated with pricing and ratings of offerings, subscription management, settlement services and services associated with catalogs of service offerings.

It is to be understood that while the term "customer" above is used in the context of a party obtaining/using (consuming) a service from service provider 121 or 122, it is to be understood that one or both of service providers 121 and 122 could be considered itself a consumer. By way of one example, in the case where a customer C buys a service from SP1 (e.g., an on-line accounting service) and SP1 in turn buys a service from SP2 (e.g., a data backup service), both C and SP1 are consumers of services offered through the BSSSP.

The service provider portal 111 provides user interfaces (UIs) for functions related to, for example, defining one or more offerings, a purchasing model, subscriptions management options, provisioning procedures, onboarding procedures, registration information, reports and selection of billing and payment mechanisms.

Defining one or more offerings may include, for example, functions of forming the one or more offerings, related attributes of the offerings, related prices of the offerings, and one or more related offers in a BSS core service. An exemplary tool for defining one or more offerings is a specialized class and/or ontology diagramming tool.

The purchasing model may have an associated function of, for example, choosing a single-item cart model or a multi-item cart model. An exemplary tool for functions related to the purchasing model is a form (e.g., a web-based form to be filled out).

The subscriptions management options may include, for example, what subscription management actions are provided and whether a customer has multiple subscriptions. An exemplary tool for functions related to the subscription management is a form (e.g., a web-based form to be filled out).

The provisioning procedures may have an associated function of, for example, specifying provisioning procedures for ordered items. Exemplary tools for functions related to the provisioning procedures are Unified Modeling Language (UML) activity diagrams and Business Process Modeling Notation (BPMN) flows and/or State diagrams. UML is a standardized general-purpose modeling language. BPMN is a graphical representation for specifying business processes in a workflow.

Onboarding is a known business management term and, as is generally understood and used herein, onboarding is a process of acquiring, accommodating, assimilating and/or accelerating new users into a system, culture or methodology. Onboarding procedures may have an associated function of, for example, specifying the procedures for onboarding. Exemplary tools for functions related to the onboarding procedures are UML activity diagrams and BPMN flows and/or State diagrams.

Registration Information may have an associated function of, for example, specifying data needed for registration of customers and/or subscribers. An exemplary tool for functions related to the registration information is a form (e.g., a web-based form to be filled out).

Selection of billing and payment mechanisms may include, for example, service providers selecting how settlement (e.g., payment) is performed between the service provider and the BSSSP, and between the service provider and customers receiving services of the service provider.

Reports may have associated functions of, for example, designing and forming the reports, for example, using Business Intelligence and Reporting Tools (BIRT) (open source software tools that provides reporting and business intelligence capabilities for rich client and Web applications) such as a BIRT report designer tool.

The BSSSP 110 may provide, for example, one or more human interfaces (e.g., the service customer portal 112 and the service provider portal 111) and one or more programmatic interfaces (e.g., the BSSSP APIs 113). The human interface may provide, for example, functions necessary for registration, subscription, and user account management. With the human interface, users may browse and search a services catalog, view invoices related to the user, and see various reports of service usage. The programmatic interface supports automatic subscriptions from services that use other services registered to the BSSSP. Another example of a programmatic interface is a Web-site-vulnerability scanning tool that subscribes to virtual machines provided by a "compute cloud" service. Service providers may notify the BSSSP of various events, such as service disruptions.

BSS are characterized by (i) a data model representing customers and subscriptions, (ii) a set of processes that support business transactions, for example, a customer onboarding process, a provisioning process for provisioning new subscriptions, a bill generation process, a revenue payment process, and other processes for supporting other business transactions, and (iii) a set of roles involved in the processes. These data models, processes, and roles may be integrated. For example, the customer onboarding process for a customer that is a government may require different accounting procedures than for non-government customers. Separate roles may be defined for service-provider employees who specify and handle the billing for government customers.

The data model, processes, and roles may be realized in a set of systems that are developed or configured and integrated specifically for an application. The services provided by the systems include user interfaces for various tasks (e.g., registering customers, handling customer requests for billing adjustments, and adding or updating offering information) and automated systems to perform, for example, billing and provisioning new subscriptions.

A challenge for providing BaaS by a BSSSP is to be able to capture the BSS data models, processes, and roles required by the service provider and enable the service provider to specify the BSS data models, processes, and roles required such that the level of integration is nearly the same or nearly the same as if the BSS functions were implemented by the service provider itself. Embodiments of the invention address this challenge by comprising specification tools required to capture the BSS data models, processes, and roles. Embodiments of the invention further comprise processing functions and storage functions required to enact specification associated with the specification tools.

Figure 2:
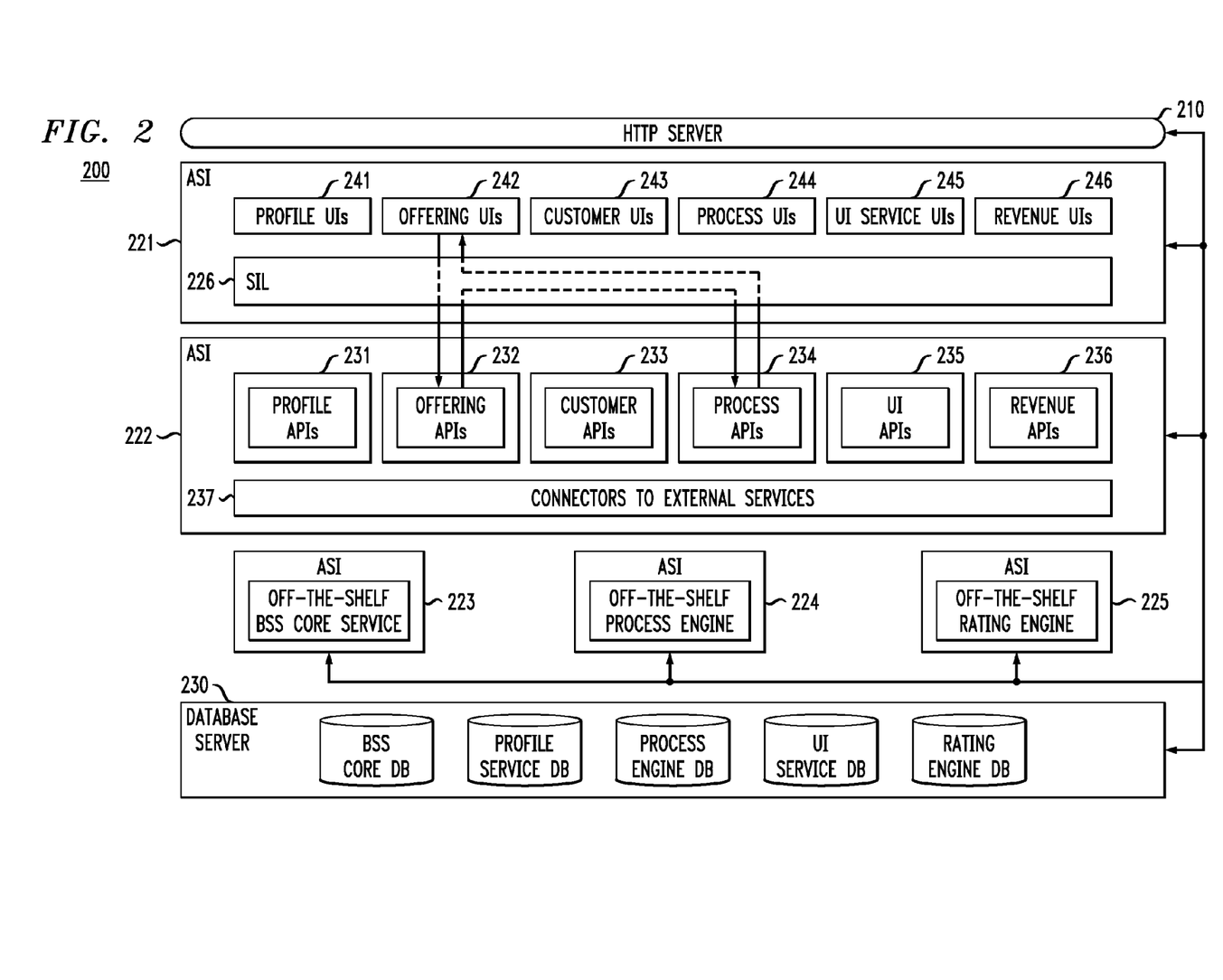
FIG. 2 illustrates a three-tier Web-application architecture for implementing aspects, elements, methods or embodiments of the invention.

Embodiments of the invention may be implemented in, for example, a three-tier Web-application architecture 200 shown in FIG. 2 and comprising a hypertext transfer protocol (HTTP) server tier comprising an HTTP server 210, an application server tier comprising application server instances (ASI) 221-225, and a database server tier comprising a database server 230.

HTTP sessions on the HTTP server 210 are, for example, used to store information about users interacting with the computing platform 200. The identity of the users, information about the service provider the users serve, and roles the users act in for the service provider that the users serve are stored in session objects.

The architecture and implementation of service modules may be defined in the application-server tier and in databases associated with the architecture and implementation (e.g., databases in the database server 230). The number of application server instances of architecture 200 represents an exemplary configuration; more or fewer application server instances are possible. The application server instance 222 comprises a portion of a profile service module 231 including one or more profile service APIs, a portion of an offering service module 232 including one or more offering service APIs, a portion of a customer service module 233 including one or more customer service APIs, a portion of a process service module 234 including one or more process service APIs, a portion of a UI service module 235 including one or more UI service APIs, a portion of a revenue service module 236 including one or more revenue service APIs, and one or more connections to external services block 237. The application server instance 221 comprises one or more profile service UIs 241, one or more offering service UIs 242, one or more customer service UIs 243, one or more process service UIs 244, one or more UI service UIs 245, one or more revenue service UIs 246, and a service invocation layer (SIL) 226.

As an example, interaction between the offering and the process service modules through the SIL 226 is illustrated in FIG. 2. Coupling from the offering service UIs 242 to offering service APIs is through the SIL 226. Coupling from the offering service APIs to the process service APIs is through the SIL 226. Coupling from the process service APIs back to the offering service UIs 242 is through the SIL 226. An operation from the offering service UIs 242 to the Offering Service APIs 232, upon return through the SIL, may result in, for example, invocation of a process specified by the service provider. Thus, the SIL enables "side-effects" of service invocations to be programmed, i.e., an invocation associated with one service module can be programmed to result in a follow-on invocation associated with another service module.

The core service application server instance 223 comprises a BSS core service module. The process engine application server instance 224 comprises a process engine. The rating engine application server instance 225 comprises a rating engine.

The database server 230 comprises a BSS core database associated with the core service application server instance 223, a profile service database associated with the profile service module, a process engine database associated with the process engine application server instance 224, a UI service database associated with the UI service module and a rating engine database associated with the rating engine application server instance 225.

The HTTP server 210 is coupled to one or more of the applications server instances 221-225 and to the database server 230. The database server 230 is further coupled to one or more of the applications server instances 221-225.

The service modules, associated UIs, associated APIs and implementation are described below.

A specific embodiment of the invention consists of six primary service modules corresponding to six primary respective BaaS services: (i) a profile service module providing profile services; (ii) an offering service module providing offering services; (iii) a customer service module providing customer services; (iv) a process service module providing process services; (v) a user interface (UI) service module providing user interface services; and (vi) a revenue service module providing revenue services. Each module may include, for example, one or more APIs operative for programmatic access to one or more functions of the module, as well as one or more user interfaces operative for interactive access. The six primary service modules may be provided by the BSSSP to, for example, one or more service providers. The six primary service modules may be operative to provide business support services to the one or more service providers. The service modules may comprise, for example, instruction code operative to be executed on a processor device. The six primary modules are described below.

First, consider the profile service module. Service providers may use the profile service module to, for example, register with the BSSSP, add and remove users of the service provider (i.e., users of services of the service provider), define the roles played by the users of the service provider, and provide a set of base data used in other service modules.

A roles model enables service providers to define roles that relate to business of the service provider. UIs are provided for role definition and role assignment. The roles are supported by enabling service providers to specify the roles for various authorization decisions in the other services.

As used herein, a role is a named set of one or more users who are associated with capabilities that may be defined by a service provider. A typical capability is, for example, the ability to perform a certain action. For example, a service provider may specify that only a user in the "business office" role may modify a billing process model. A capability may or may not have a representation. The capability may be defined by the fact of the role being used to give the ability to perform a particular action.

A role may specialize another role by being associated with a particular party, such as a customer or user. Party-specific roles may provide a built-in "failover" mechanism that can allow any member in a role to perform the task specified for a particular party. As an example, a service provider may specify that any contract manager can approve a change in a contract for Acme Tool Company if the contract manager for Acme Tool Company is not in the office.

Party-specific roles may be declared to be "singleton" roles, containing only one user.

A role A may delegate its capabilities to another role B. In this case, any user in role B also has the capabilities of A. Role delegation is a mechanism to give broad capabilities to particular users.

The specific embodiment of the invention provides one or more predefined roles that are used to define capabilities in UIs. The predefined roles are: (i) offering administrator; (ii) offer manager; and (iii) service manager. The offering administrator may, for example, register service products, define roles and assign users to roles. The offer manager may, for example, define an offerings catalog and delegate to the offering administrator. The service manager may, for example, configure connections to service products for provisioning and usage-based billing and delegate to the offering administrator. Note that the delegation of offer manager and service manager capabilities to the offering administrator may be, for example, merely a convenience, since an offering administrator could, by virtue of his power to assign users to roles, give himself the roles of the offer manager and the service manager. Service products are understood to be products of a service provider.

Consider the processes. In addition to defining roles and assigning users to roles, the offering administrator may also be enabled to define processes or workflows that are invoked when certain actions are taken. Each service module is operative to declare or specify a set of actions (i.e., one or more actions) for which one or more processes can be attached or assigned. Using a UI for the process service module, an offering manager may define a process workflow and assign it to an action.

The UI for profile service may comprise simple forms for registering as a service provider and for registering, listing, and deleting users. Defining a new role and assigning a user to a role are exemplary tasks supported for defining roles.

Regarding the task of defining of a new role, a user, for example, may enter the role name, the type of entity the role is specific for, and if the role is entity-specific, another role the role delegates to, if any. If the role is entity-specific, the user may enter whether or not the role is a singleton role. As used here, "entity" is some object type in the system. An example is "Customer." A role of "Contract Manager [Customer]" means that there can be specific instances of this role such as, for example, "Contract Manager [General Mills]."

Figure 3A:
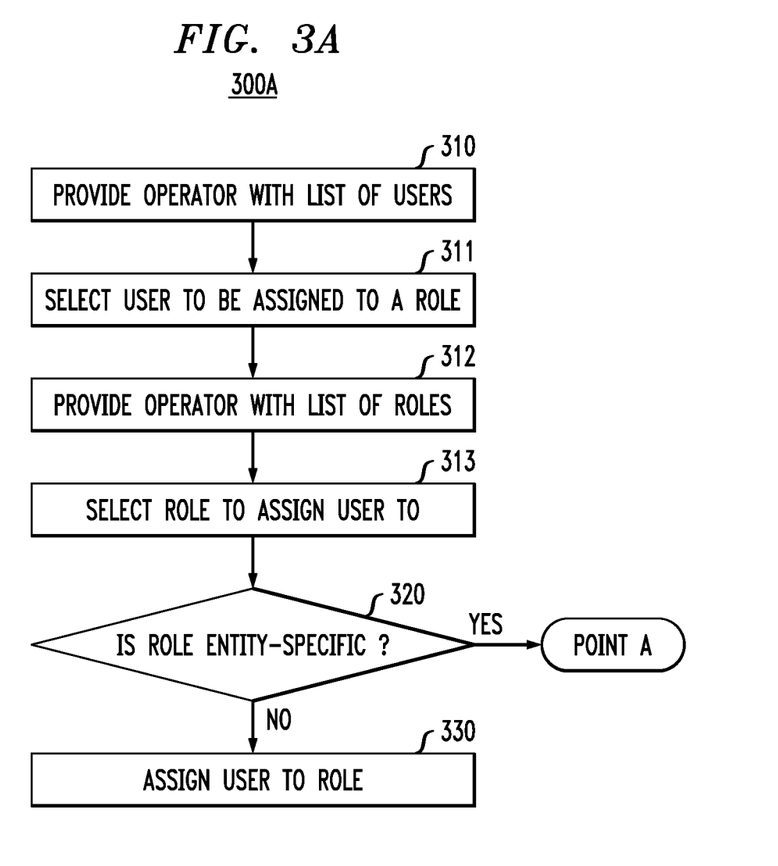
FIGS. 3A and B are flow diagrams of a method for assigning roles according to an embodiment of the invention.
Figure 3B:
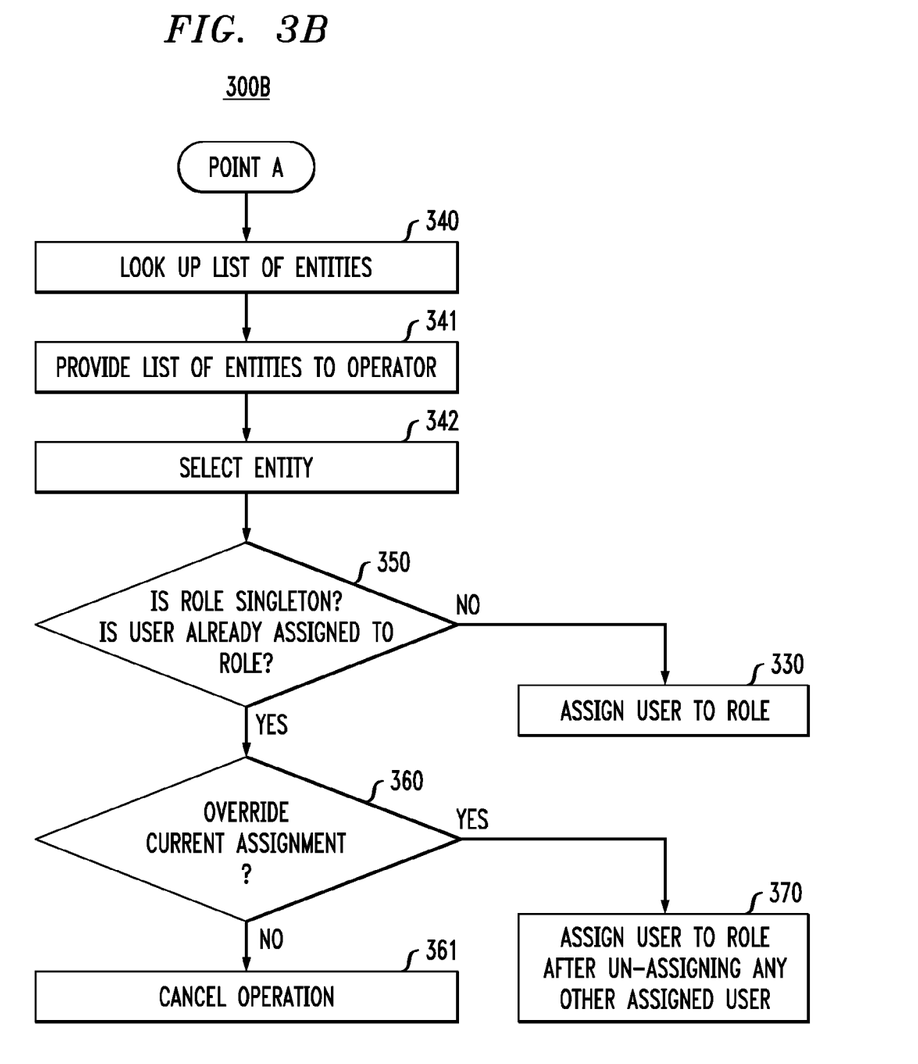

Regarding the task of assigning a user to a role, FIGS. 3A and B are flow diagrams for a method 300 for assigning roles according to an embodiment of the invention. A first portion 300A of method 300 is shown in FIG. 3A. A second portion 300B of method 300 is shown in FIG. 3B. An object of the method 300 is to assign a user (e.g., a manager of the service provider) to a role. An operator is a person or an entity (e.g., instruction code running on a processing device) of the service provider who performs the method.

Step 310 comprises providing the operator with a list of users of a service provider. Step 311 comprises the operator selecting a user to be assigned to a role. The user is from the list of users Step 312 comprises providing the operator with a list of roles of the service provider. Step 313 comprises the operator selecting a role to which the user will be assigned. The role is from the list of roles.

Step 320 comprises a decision regarding whether or not the role is an entity-specific role. If the role is not entity-specific, the operator assigns the user to the role in step 330. If the role is entity-specific, the next step in method 300 is step 340 of the second portion 300B of method 300 shown in FIG. 3B.

Step 340 comprises looking up a list of entities which is provided to the operator in step 341. Step 340 may be performed, for example, such that the list of entities is looked up according to an entity type. An automated system (e.g., instruction code running on a processor device) may look up the list of entities. In step 342 the operator selects the entity from the list of entities.

Step 350 comprises a decision regarding whether or not the role that the user is to be assigned to from step 313 is a singleton-role (i.e., a role having only one user assigned to the role). If the role is not a singleton-role, the user is assigned to the role in step 330. If the role is a singleton-role, the method 300 proceeds to step 360 comprising a decision regarding whether or not the current assignment of another operator to the singleton-role (if there is a current assignment) is to be overridden (i.e., un-assign the other user and assign the current user). If no, the operation is cancelled in step 361 without reassignment of roles. If yes and if there already is a current assignment, the other user is un-assigned from the role in step 370. If yes, the role is assigned to the user in step 370.

Regarding the task of assign permissions to roles, certain elements in a UI of BaaS are enabled only if the user has particular permissions. Each such element may be associated with a unique identifier. For example, a button that brings up a form to modify a subscription may have the identifier "Customer.Subscription.Edit." The profile service module maintains a table that associates each UI element identifier with the list of roles for which that element should be enabled. When a UI containing such elements is presented to the user, each element is enabled only if the role of the user is in the list for that element.

Role definitions and role assignments may be stored in one or more database table (e.g., a portion of the profile service database of database server 230) comprising, for example, entries according to TABLE 1A and TABLE 1B, respectively.

TABLE 1A

| Column | Type | Description |
|---|---|---|
| RoleId | BIGINT | The system-wide unique identifier for this role. |
| ServiceProviderId | BIGINT | |
| ServiceProductId | BIGINT | |
| RoleName | VARCHAR | |
| IsEntitySpecific | BOOLEAN | See Section 2.1.1. |
| IsSingleton | BOOLEAN | See Section 2.1.1. |
| DelegatesTo | VARCHAR | See Section 2.1.1. |

TABLE 1B

| Column | Type | Description |
|---|---|---|
| UserId | BIGINT | The system-wide unique identifier for the user. |
| RoleId | BIGINT | The role ID. |
| EntityId | VARCHAR | The ID of the entity the user acts in the role for, such as a customer ID. |

Next, consider the offering service module. The offering service module enables service providers to register one or more service products, define or form one or more offerings of one or more service-products (e.g., service product configurations), and create or form one or more prices for one or more offerings of service products to be listed in a catalog. The offering service module may comprise a database (e.g., a database residing in the database server 230) for storing data for one or more service products (e.g., information on one or more service products), one or more offerings of service products, and/or one or more prices for one or more offerings of service products. The service products are service products of, for example, one or more service providers. The offering service module may, for example, enable the functions of creating, reading, updating, and deleting data in this database, may service interfaces (e.g., offering APIs) to enable programmatic access to these functions, and may service a set of UIs (e.g., offering UIs 242) to enable interactive access to functions of the offering service module.

Using the offering service module, service providers may create and/or manage (e.g., create and/or manage interactively or programmatically) information regarding service products of the service providers, various offerings of products of the service providers, and pricing of the offerings. Associated information may underlie other services.

UIs of the offering service module (e.g., offering UIs 242) may, for example, provide four sections of UIs each related to one of the following functions: the function of registering products of the service provider; the function of defining or forming offerings of service products; the function of registering contracts of the service provider; and the function of defining or forming offers of service products. One or more UIs for register products function may show a list of products and enable users to add product records to the list, remove records from the list, and edit a record in the list.

An exemplary UI for the define offerings function shows the set of offerings, grouped by product and by offering family, that a service provider has registered. An offering family is a named group of offerings. The offering set or collection may be presented, for example, as a tree for easy browsing. The exemplary UI further shows a set of tabbed panes showing information for a particular offering selected in the tree. Offering Properties comprises a basic set of data stored for each offering. Offering Attributes comprises a set of attributes service providers may associate with an offering. Service modules provide information about how the BaaS infrastructure may communicate with the service-product infrastructure when predefined events in the BSS occur, for example, when a new customer is registered, a new subscription is made, a subscription is modified or canceled, or usage data must be collected.

A UI for Register Contracts enables users to view a list of contracts that have been uploaded and restricted according to the role of the user, and to view a particular contract. When a contract is uploaded, the user may preview it before initiating the process that the service provider has defined must be performed when contracts are obtained or provided. Such a process is defined using the process service module.

A UI for Define Offers enables users to create and manage the offers that are made available to customers. An offer is an offering sold with a particular price and set of terms. The collection of offers may be presented as a tree. When a user selects an offer in the tree, the properties of the offer are then shown in the UI.

An "Availability of this Offer" UI enables service providers to make the associated offer available to selected customers, and provides a variety of selection mechanisms. The offer can be available to all customers, only to the customer associated with a particular contract, to a specified set of customers, or to any customer who meets a given set of criteria. Criteria may be expressed as, for example, Boolean expressions (logical and relational operators) comprising customer attributes, such as region, number of employees, or industry. Criteria can be used to deny access to particular customers, such as competitors.

Except for the involvement of a SIL (e.g., SIL 226 in FIG. 2), implementation of the offering service module largely comprises data-access functions and data formatting for the user interface. Interaction of service modules with the SIL is has been previously presented with respect to FIG. 2

Next, consider the customer service module. The customer service module provides those BSS functions related to customers of the service provider except for functions related to revenue that are provided by the revenue service module. The functions provided by the customer service module may include, for example, functions related to one or more customer registrations, one or more customer contracts of the service provider, and one or more subscriptions of one or more customers of the service provider, and performing other functions related to one or more customers of the service provider. The customer service module comprises or is associated with a database for storing data related to customers and subscriptions of customers (e.g., registration data and contract data). The customer service module provides logic for updating the database when specific events occur, for example, when customers are registered or unregistered, when subscriptions are added or removed, and for notifying operational systems of service products of these events.

Exemplary UIs of the customer service module may comprise three sections: a customers section, a contracts section, and a subscriptions section. The customers section provides basic functions for viewing registered customers (e.g., viewing customer registrations), registering new customers, and modifying and deleting customer registrations. The contracts section may provide to users a list of contracts that have been uploaded and/or restricted according to the role of the user. The contacts section may further provide a particular contract to users. When a contract is uploaded, the user may preview the contact before initiating the process that the service provider has defined must be performed when contracts are obtained, provided or used. Such a process is defined using the process service module. Using the subscriptions section, service providers may view or otherwise obtain subscriptions that customers have made, and, if the viewing or obtaining person of the service provider is in the customer manager or offering administrator role, the person may make changes to subscriptions or perform other administrative actions.

The customer service module is implemented similarly to the offering service module.

Next, consider the process service module. The process service module enables service providers to define or form processes to be invoked when certain actions (i.e., events) occur. The process service module may be, for example, an extensible event-handling system provided in a user-interface framework. A process, in this context, may be, for example, a program developed in a scripting system, typically using a graphical notation such as a flow diagram, which interfaces to the BaaS service APIs as well as external services such as a simple mail transfer protocol (SMTP) server for sending email.

A process service module UIs may, for example, comprise tools for developing and testing processes, invoking the processes, inspecting in-flight processes (e.g., inspection the execution performance of one or more processes), and gathering process metrics, for example, timings from one process step to another. A process service module may comprise one or more APIs operative to create, read, update, delete, invoke and/or stop one or more processes.

The UIs of the process service module may enable service providers to develop processes to handle actions that are generated in or associated with any of the other service modules. Processes are attached to the methods that may be invoked on services of service modules. When a service method is invoked, a process may be invoked following the method, receiving the results of the method invocation.

Process development begins with the user viewing a set of process templates and either choosing one or beginning with a blank page. The user may select a name for the process and select the service product it will apply to. By way of example only, a graphical flow-diagram editor is provided as the process development tool. Business process modeling notation (BPMN) is a notation that may be used. A range of concrete activity types is supported, for example, file storage and invoking human tasks to be completed by other service-provider users.

Once the process model has been developed, the user may attach the process model to an action (service method invocation). Drop-down lists of method names may be provided. The drop down lists may be generated automatically if reflection is supported by the runtime language, or by an explicit list of names if not. A record of which process to invoke on which action is kept by the SIL (e.g., SIL 226).

A process editor (e.g., a process editor associated with the process service module) is distinguished from typical flow-diagram editors in that integration of the process editor with the entire set of BaaS services enables process developers to specify a level of execution behavior that other editors cannot.

Regarding invoking a process as a result of an action, the BaaS process editor (e.g., the process editor associated with the process service module) enables the user to declare that the process is invoked as the result of an action. The effect of invoking the process is to place the object type of the service-method result in the initial data set of the process. This object type can then be used elsewhere in the development of the process model. For example, if the process is invoked as a result of new-user registration, the initial data set of the process will contain the object type of "User." Also by way of example, if the developer has determined that the user should be sent an email asking the user to log on and confirm registration of the user, the editor will enable the developer to select "User.emailAddress" from a type inspector when the developer is programming the task that sends the email.

Regarding invoking service methods from processes, BaaS processes are able to invoke the methods of other BaaS services. The process editor facilitates invoking the methods of other BaaS services (i.e., service methods) by displaying the declared type the method expects as input. The editor also has knowledge of the data set of the process at the time of invocation and flags the developer if no object in the data set matches the input type expected by the method. These type-based programming aides are analogous to those provided in the integrated development environments such as Eclipse, for Java programs.

Regarding swimlane development, a swimlane is notation in flow diagramming that specifies the role a person must have in order to perform a given task. An exemplary process diagram is divided into one or more horizontal regions, wherein each region is a swimlane associated with a respective role. A task is placed in a swimlane to indicate who (i.e., which role) should perform that task. The BaaS flow-diagram editor facilitates swimlanes by knowing the list of roles a service provider has declared through the profile service module. When a developer creates a swimlane, the editor displays the list of roles the developer may choose from. If elsewhere in the process model it is required that a role is a singleton role, and the developer has not chosen a singleton role, the editor may raise a warning.

Regarding task assignment, when a process task is of the kind that is performed by a person, it must be directed (assigned) to a particular person. Typically the identity of the person would not be specified in the process, but rather the role; thus, the assignment may be to a role. For example, an expense-approval process would, once an expense report has been submitted by an employee, direct the expense report to the manager of the employee. The swimlane for the "Approve Expense Report" task would be tagged as "Manager", leaving the selection of the particular manager to the process engine. The BaaS process service module may, given the identity of the employee (e.g., "Bob"), request from the profile service module (e.g., using a method called getUserInRoleForParty) the identity of the employee acting in the role of Manager-of-Bob.

Regarding task reassignment, a task that has been assigned to a particular person in a party-specific role can be stalled if that person is not able to perform the task due to, for example, absence. In this case, to avoid the stalling the process, any user acting in the role of process manager (e.g., a built-in role that delegates to the offering administrator) may reassign the task to any user in the non-party-specific role.

Next, consider the UI service module. The UI service module assists service-product developers who need to provide BSS-related user interfaces for users, for example, for tasks such as registering new customers and viewing subscriptions. For example, a service provider uses the UI service module to form one or more service provider UIs for BSS-related UIs for users of the service provider. The UI service module provides the concept of a "BSS widget." A BSS widget is a predefined UI element that is integrated with one or more functions of another BaaS services. Service providers may use tools provided by the UI service module to create a BSS widget and/or tailor the BSS widget for service product of the service providers. The service providers include the BSS widget in one or more UIs of service product of the service providers using a mechanism such as, for example, a HyperText Markup Language (HTML) <iframe> tag.

The UI service module enables service-product developers to more rapidly create or form BSS-related user interfaces and associated back-end functions. The UI service module may provide a set of user-interface templates that are useable or adaptable to requirements of a service provider, and are already connected to the BaaS infrastructure. The templates are operative or adaptable to form one or more UIs related to BSS.

One or more UIs of the UI service module enable users to create and modify BSS "widgets" that are integrated with BSS data services. For example, in a main screen of a UI, the user may be presented with two tabs. The first tab enables the user to create new widgets, presents a list of widget "templates" and displays information about each template, including a preview. To create a new widget, the user selects a template and pushes a "Create Widget" button. The system prompts the user for the name to be given to the widget and presents a list of the products of the service provider that the widget may be used for or associated with. Having the choice of template, the name for the widget, and the identity (ID) of the selected service product, the system creates a record of the widget and switches the UI to show the another tab, which enables a user to edit widgets already created.

A widget may comprise or be associated with an HTML template, a set of properties that control the generation of HTML from the template, a Java class that knows how to use the properties and the template to generate the HTML that will represent the customized widget of the service provider, and a form in the UI that enables users to edit widget properties.

Widget properties, for example, may encode the ways that the widget designer enabled the widget to be customized. One property, for example, may be a list of input fields that the service provider requires to be used in a registration form. Another property may be the name of a style sheet to be used by the widget. The UI service module may provide a mechanism for service providers to upload style sheets. Widgets may be stored in a database table comprising, for example, entries according to TABLE 2.

TABLE 2

| Column | Type | Description |
| --- | --- | --- |
| PageId | BIGINT | The ID of this customized widget. |
| ServiceProviderId | BIGINT | The ID of the service provider. |
| ServiceProductId | BIGINT | The ID of the service product. |
| PageName | VARCHAR | The name of the widget. |
| PageProperties | VARCHAR | A property set formatted via the java.util.Properties.store ( ) method. |

Widgets are served by a servlet, given the identity (ID) of the widget passed as part of the path of an associated Uniform Resource Locator (URL). Developers of a service-product site may include the widget in their site using, for example, an <iframe> tag. The URL of the widget may be available from the UI service module UI. As is known in the art and is used herein, a servlet is a Java class which conforms to the Java servlet API, a protocol by which a Java class may respond to http requests. A software developer may use a servlet to add dynamic content to a Web server using the Java platform. The generated content is commonly HTML, but may be other data such as data of Extensible Markup Language (XML).

For each request for a widget, the UI service module servlet first looks up the widget record using an identity (ID) received in the request. The widget properties indicate the template and the template class. The servlet loads the template from the file system, instantiates the template class, and then invokes a method on the class to process the template and properties to produce the page.

Finally, consider the revenue service module. The revenue service module provides those functions related to revenue received by the service provider, including, for example, billing, cost accounting, and/or royalty payments. The revenue service module may be operative to provide functions related to the service provider billing for revenue and receiving revenue. The revenue service module may be coupled to payment mechanisms (e.g., electronic bank drafts and credit-card systems). The revenue service module may comprise, a rating engine that computes, for example, charges (e.g., billing charges), costs, and/or royalty payments, and one or more UIs enabling, for example, offer managers to connect and provide usage data to a rating algorithm associated with the rating engine. The rating engine may comprise, for example, software for running on a processor device. The rating engine may optionally further comprise the processor device and, optionally, memory coupled to the processor device. The usage data may be coming from, for example, an operational system of a service product. The rating engine may or may not be a third-party component. Various methods for computing changes are known in the art. Charges that are based purely on subscriptions may not require an offering manager to explicitly connect usage data to rating algorithms; the revenue service module may invoke rating algorithms given subscription data retrieved from the customer service module.

One or more UIs of the revenue service module, for example, may be provided by an off-the-shelf rating engine, for which the user forms rating procedures that process subscription records and possibly usage records and generate bills.

The UIs of the revenue service module, for example, may reflect contents of the rating engine so that users can confirm proper configuration of offerings. The UIs of the revenue service module, for example, may further set billing schedules and initiate billing processes interactively, and at least partially provide or facilitate connection of a "feed" of billing records to the rating engine for a service product.

A service provider that requires usage-based billing may first registers URLs of the usage data feeds coming from an operational systems of the service product. For example, Atom or Really Simple Syndication (RSS) feeds may be used as the source of usage data, or a specification of a query to access usage-data records may represent the feed.

The revenue service module UIs, for example, may enable users to specify the sources of usage data of a service product and generate test output that will be fed to the rating engine. Consequently, billing generation, for example, may be simulated before a service product goes into revenue service.

A significant task of the revenue service module, besides other tasks associated with the rating engine, comprises providing usage-data records to the rating engine. The revenue service module may have built-in knowledge of the format of usage data records expected by the rating engine.

Figure 4:
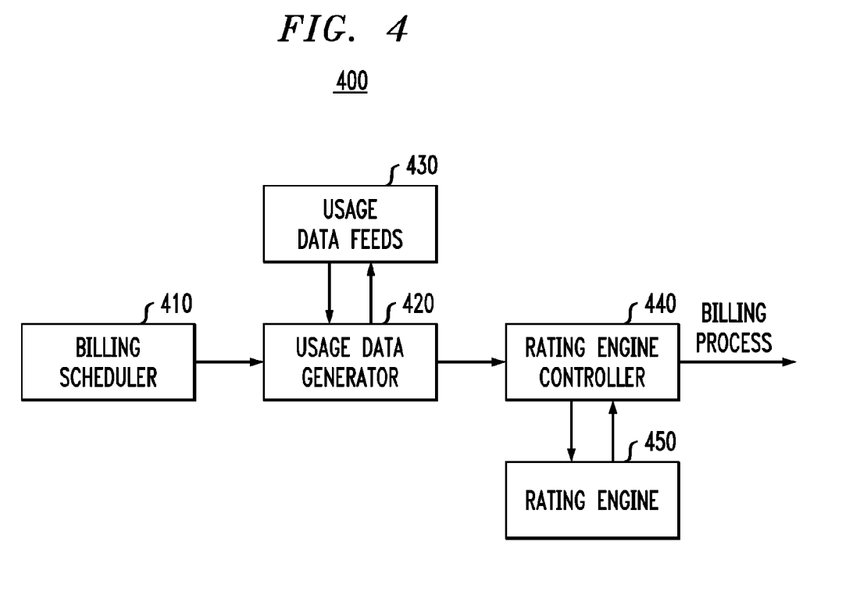
FIG. 4 illustrates a component diagram of a revenue service module according to an embodiment of the invention.

FIG. 4 illustrates a diagram of a revenue service module 400 according to an embodiment of the invention. The revenue service module 400 is operative to perform a BSS billing method according to an embodiment of the invention. The diagram also indicates couplings or interactions between components in order to perform the BSS billing method. The revenue service module 400 comprises a billing scheduler 410, a usage data generator 420, one or more usage data feeds 430, a rating engine controller 440, and a rating engine 450. The usage data generator 420 is coupled to and receives input from the billing scheduler 410 and is further coupled to the one or more data feeds 430. The rating engine controller is coupled to and receives input from the usage data generator 420 and is further coupled to the rating engine 450. The rating engine controller 440 functions, for example, to invoke, direct and/or provide at least a portion of a customer billing process.

The BSS billing method begins with the billing scheduler 410 initiating a billing operation for a given customer or a particular group of customers (e.g., customers of a particular geographic area), for example, according to schedules specified when the customers are registered. The usage data generator 420 retrieves usage data from the one or more usage data feeds 430 (e.g., usage data sources registered for a service product associated with the billing) and passes the usage data to the rating engine controller 440. The rating engine controller 440 provides the rating engine 450 with the usage data and receives in response a bill generated by, for example, one or more rating formulas specified by the service provider. The rating engine controller 440 then invokes the customer billing process specified by the service provider, providing the bill as a parameter.

As previously mentioned, an offering administrator may define processes to be invoked when certain actions are taken, such as new-user registration. Rather than fixing the set of actions (i.e., one or more actions) that may be taken in various service module UIs, the BaaS defines a general mechanism for invoking processes when actions are taken.

As illustrated in FIG. 2, user actions in service module UIs (e.g., the offering UI 242) that result in calls to service module APIs (e.g., the offering API of FIG. 2) go through the SIL. The SIL may provide, for example, a convenience function of offering the service module APIs in a form more easily used in a user-interface instruction code (e.g., instruction code associated with Java). The SIL may additionally or alternately provide, for example, a table-based mechanism for invoking processes when actions are taken. A skip-process flag may be provided on each method that enables a caller to direct the SIL to not invoke a process for a particular call, as may be necessary for some non-interactive calls when data needs to be pushed into a service for testing purposes.

The SIL may look up a process to invoke in a database table maintained by the SIL, for example, a database table having records or entries shown in TABLE 3. For example, the SIL may look up a process by supplying the service provider ID, the service product ID, and the service method name. The process service module API may then be used to invoke the process.

TABLE 3

| Column | Type | Description |
| --- | --- | --- |
| ServiceProviderId | BIGINT | ID of the service provider. |
| ServiceProductId | BIGINT | ID of the service product. |
| ServiceMethodName | VARCHAR | Name of the service method that is being invoked. Form is service.method. For example, ProfileService.registerUser |
| ProcessId | BIGINT | ID of the process. |

Figure 5:
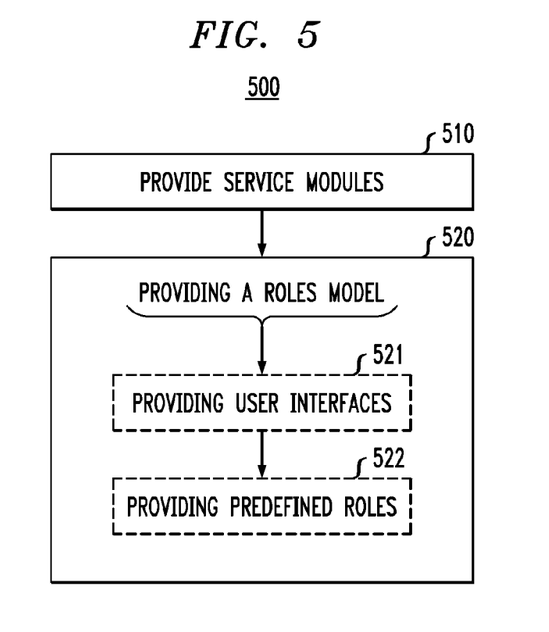
FIG. 5 is a flow diagram of a method of providing business support services as a service to a service provider according to an embodiment of the invention.

FIG. 5 is a flow diagram of a method 500 of providing BSS as a service to a service provider according to an embodiment of the invention. The BSS are provided by a BSSSP to the service provider. Step 510 comprises providing one or more service modules, for example, including one or more of the following service modules: (i) a profile service module; (ii) an offering service module; (iii) a customer service module; (iv) a process service module; (v) a UI service module; and (vi) a revenue service. Each service module may include, for example, one or more application programming interfaces (APIs) operative for programmatic access to one or more functions of the module, as well as one or more user interfaces operative for interactive access. The service modules are operative to provide the business support services to the service provider, and are as described herein. The one or more service modules may comprise, for example, instruction code operative to be executed on a processor device, for example, a processor device coupled to memory.

Step 520 comprises providing a roles model operative for the service provider to define or form one or more roles related to the service provider. A role of the one or more roles comprises a named set of one or more users who are associated with capabilities that are according to the service provider. The providing of the roles model (step 520) may comprise sub-step 521 of providing one or more user interfaces for role definition and/or role assignment. The providing of the roles model (step 520) may further comprise sub-step 522 of providing predefined roles. Keeping in mind that each of the one or more service modules may comprise one or more associated service module UIs, the predefined roles are operative to, for example, define or form capabilities in at least one of the one or more service module UIs. The roles model and associated roles are further described herein.

Although certain exemplary embodiments of the invention relate to BSS, the invention is not so limited; other support services besides BSS are contemplated.

To illustrate how BSSSP is used and the relationships among its components, we provide an illustrative scenario involving the following parties. Assume PhCo is a pharmaceutical company in need of scientific computing services; SCS is a scientific computing services company providing a range of data-analysis functions for large data sets; and CC is a compute cloud provider offering virtual machines for general-purpose computing. SCS is one of CC's customers. When SCS receives a new order for services from PhCo, SCS will calculate the computing resources required for that order and in turn place an order with CC for those resources. Both SCS and CC use BSSSP services for their BSS functions. As we begin the scenario, assume CC has already configured BSSSP for its BSS functions, and SCS is just beginning its configuration of BSSSP. All figure-element numbers refer to FIG. 2. The first part (Part 1) of the scenario describes BSSSP configuration, and the second part (Part 2) describes BSSSP operations for certain business transactions.

Part 1: BSSSP Configuration

An SCS Offering Administrator (OA) configures its offerings via the Offering Service UIs (242). At this time, only basic information of the offering is entered, such as description, the charge basis for the offering, what are the units of the offering (e.g., seat) and how many units are included with this offering.

SCS needs to know when a new service subscription has been created so it can obtain computing resources from CC. In order to receive these notifications it must register a set of service-provisioning endpoints (URLs) with the BSSSP. These are network addresses of components of the SCS service to which the BSSSP can send messages.

Using the Process Framework UIs (244), the OA creates a process that receives notification of a new subscription and, based on the subscription level, communicates the subscription to the SCS service through its service-provisioning endpoints. The OA can then return to the Offering Service UIs and specify that this process be invoked whenever a customer subscribes to one of its offerings.

Using the Revenue Service UIs, the OA specifies how charges are computed for its offerings. The Revenue Service queries the Offering Service for which offerings have been registered, and units used for each offering, in order to provide a UI tailored to the SCS offerings.

Customers such as PhCo will place orders through a customer portal provided by SCS. This portal will make use of a catalog user-interface element ("widget") provided by BSSSP's UI Service. The OA configures this widget through the UI Service user interface. SCS will also use a customer-registration widget, but requires a particular customer registration process. The OA returns to the Process Service UIs and designs a process that puts a registration on hold until a Customer Manager has approved it. Switching to the Profile Service UIs, the OA defines a role named "Customer Manager" and enables it for access to all the functions of the Customer Service UIs. In the Process Service UI, the OA can now design a process that creates tasks in a task management system for a Customer Manager and waits for approval before proceeding. Products such as Lotus Activities can be used for the task management system.

Part 2: BSSSP Operations for Customer Registration and Offering Subscription

When PhCo registers as a customer with SCS, through SCS's customer portal, the BSSSP UI Service 235 provides the form and receives the submit action. Upon receiving the submit action, the UI Service invokes the Customer Service 233 (the customer registration template is programmed to do this), but marks the customer "inactive," as specified by the SCS OA when configuring the customer registration template. The UI Service then invokes the process that the SCS OA specified should be invoked when this form is processed, through the Process Service 234.

When PhCo subscribes to an SCS offering using a subscription widget configured by the SCS OA, the action again goes through the UI Service 235, which invokes the Offering Service 232 to place the subscription, and then invokes the Process Service 234 to run the process specified by the SCS OA. This process was designed by the SCS OA to notify it of the new subscription so that resources can be reserved to serve it.

When the SCS service provisioning endpoint configured to receive these notifications is invoked by the process, it calculates the resources required to fulfill the subscription and places a subscription to the BSSSP for a CC virtual-machine offering. The call goes through the BSSSP APIs 113 (FIG. 1) to the Offering Service 232 (FIG. 2). Processing from this point is according to the configurations of the BSSSP by the CC Offering Administrator.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1, 2, 3A, 3B and 4-6, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1, 2, 3A, 3B and 4-5, can also include, as described herein, providing a system, wherein the system includes distinct modules (e.g., modules comprising software, hardware or software and hardware). By way of example only, the modules may include but are not limited to the profile service module, the offering service module, the customer service module, the process service module, the UI service module, and the revenue service module. The modules may further include a provisioning module operative to provide one or more of the profile service module, the offering service module, the customer service module, the process service module, the UI service module, and the revenue service module. These and other modules may be configured, for example, to perform the steps of described and illustrated in the context of FIGS. 1, 2, 3A, 3B and 4-5.

Figure 6:
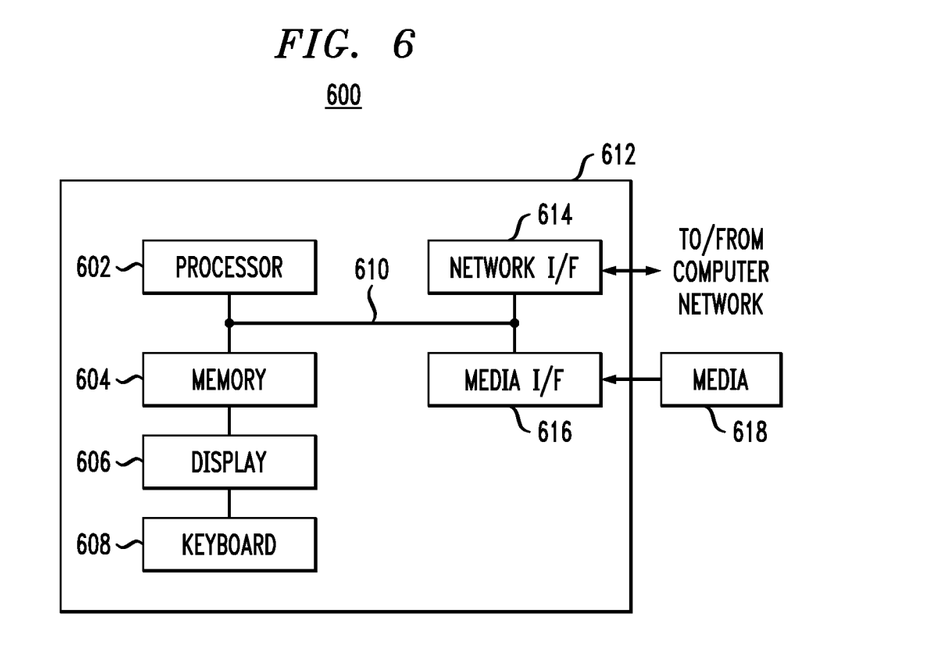
FIG. 6 depicts a computer system that may be useful in implementing one or more aspects and/or elements of the invention.

One or more embodiments can make use of software running on a general purpose computer or workstation. With reference to FIG. 6, such an implementation 600 employs, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 602, memory 604, and input/output interface such as display 606 and keyboard 608 can be interconnected, for example, via bus 610 as part of a data processing unit 612. Suitable interconnections, for example, via bus 610, can also be provided to a network interface 614, such as a network card, which can be provided to interface with a computer network, and to a media interface 616, such as a diskette or CD-ROM drive, which can be provided to interface with media 618.

A data processing system suitable for storing and/or executing program code can include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 608, display 606, pointing device, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of providing support services as a service, comprising:

a first service provider maintaining a plurality of service modules that are configured to provide business support services as a service to other service providers, wherein the plurality of service modules include one or more application programming interfaces that are configured to enable programmatic access to the plurality of service modules by the other service providers; and the first service provider providing programmatic access to functions of the plurality of service modules to a second service provider via the one or more application programming interfaces to enable the second service provider to implement a service that the second service provider provides to a customer of the second service provider using one or more of the plurality of service modules;

wherein maintaining a plurality of service modules comprises maintaining a profile service module which is configured to allow the second service provider to register with the first service provider, and to allow the second service provider to provide a roles model to define one or more roles related to the service provided by the second service provider, wherein a role of the one or more roles comprises a named set of one or more users who are associated with capabilities that are defined by the second service provider, wherein the steps of maintaining and providing the one or more service modules is implemented via instruction code that is executed by one or more processor devices.

2. The method of claim 1, wherein each of the plurality of service modules comprises one or more user interfaces operative for interactive access to a respective service module of the plurality of service modules.

3. The method of claim 1, wherein the second service provider is a provider of computing services.

4. The method of claim 1, wherein providing the roles model comprises providing one or more user interfaces for at least one of role definition and role assignment.

5. The method of claim 1, wherein each of the plurality of service modules comprises one or more service module user interfaces, and wherein providing the roles model comprises providing one or more predefined roles that are used to define capabilities in at least one of the one or more service module user interfaces.

6. The method of claim 5, wherein the one or more predefined roles comprise at least one of: (i) an offering administrator role operative to at least one of register one or more products of the second service provider, define at least one role of the one or more roles, assign users to at least one role of the one or more roles, and define processes; (ii) an offer manager role operative to at least one of define an offerings catalog and delegate to the offering administrator role; and (iii) a service manager role operative to at least one of configure connections to products of the second service provider for provisioning and usage-based billing and delegate to the offering administrator role.

7. The method of claim 1, wherein the plurality of service modules are maintained and accessed using a three-tier Web-application architecture comprising a hypertext transfer protocol (HTTP) server tier, an application server tier, and a database server tier.

8. The method of claim 1, wherein the profile service module is further configured to allow the second service provider to add or remove users of the second service provider; to allow the second service provider to define roles of users of the second service provider; and to allow the second service provider to provide data used in another one of the plurality of service modules.

9. The method of claim 8, wherein the profile service module comprises one or more forms for at least one of: (i) registering the second service provider; (ii) registering of one or more users of the second service provider; and (iii) deleting one or more users of the second service provider.

10. The method of claim 1, wherein the plurality of service modules further comprise an offering service module operative for at least one of: (i) registering one or more products of the second service provider; (ii) foaming one or more offerings of one or more products of the second service provider; (iii) forming one or more prices for one or more offerings of products of the second service provider to be listed in a catalog; and (iv) otherwise form or manage information regarding one or more products of the second service provider.

11. The method of claim 10, wherein the offering service module comprises a database for storing data for at least one of: (i) one or more products of the second service provider; (ii) one or more offerings of one or more products of the second service provider, and (iii) one or more prices for one or more offerings of products of the second service provider, and wherein the offering service module is operative to at least one of create, read, update and delete data in the database.

12. The method of claim 1, wherein the plurality of service modules further comprise a customer service module operative for at least one of: (i) registering one or more customers of the second service provider; (ii) performing functions related to one or more customer contracts of the second service provider; (iii) performing functions related to one or more subscriptions of one or more customers of the second service provider; and (iv) performing other functions related to one or more customers of the second service provider.

13. The method of claim 12, wherein the customer service module comprises a database for storing data related to at least one of: (i) registration of one or more customers of the second service provider; (ii) one or more customer contracts of the second service provider; (iii) one or more subscriptions of one or more customers of the second service provider; and (iv) other aspects of one or more customers of the second service provider, and wherein the customer service module is operative to update the database.

14. The method of claim 1, wherein the plurality of service modules further comprise a process service module operative to form one or more processes to be performed when one or more specified events occur.

15. The method of claim 14, wherein the process service module comprises at least one of: (i) a tool for developing the one or more process; (ii) a tool for testing the one or more processes; (iii) a tool for the invoking the one or more processes; (iv) a tool for inspecting execution of the one or more processes; (v) and a tool for gathering one or more metrics regarding the one or more processes.

16. The method of claim 14, wherein the process service module comprises one or more application programming interfaces operative to at least one of: create, read, update, delete, invoke and stop one or more processes.

17. The method of claim 1, wherein the plurality of service modules further comprise a user interface service module operative to form one or more user interfaces related to the support services.

18. The method of claim 17, wherein the user interface service module comprises one or more user interface templates adaptable to form the one or more user interfaces.

19. The method of claim 1, wherein the plurality of service modules further comprise a revenue service module operative to provide functions related to at least one of: (i) the second service provider billing for revenue; and (ii) the second service provider receiving revenue.

20. The method of claim 19, wherein the revenue service module at least one of: (i) is coupled to one or more payment mechanisms; (ii) comprises a processing engine that computes at least one of billing charges, costs and royalty payments; and (iii) comprises one or more user interfaces operative to at least one of provide usage data to the processing engine, set billing schedules and initiate billing processes.

21. The method of claim 2, wherein the one or more user interfaces comprises an interface for at least one of: (i) registering one or more products of the second service provider; (ii) forming offerings of one or more products of the second service provider; (iii) registering contracts of the second service provider; (iv) viewing, adding, modifying and deleting customer registrations; (v) one or more functions related to customer contract information; (vi) one or more functions related to customer subscription information; (vii) forming a second service provider user interface in conjunction with a user interface service module, and (viii) forming one or more processes in conjunction with a process service module.

22. Apparatus for providing support services as a service, the apparatus comprising:
   a memory; and
   one or more processors coupled to the memory and configured to:
      enable a first service provider to maintain a plurality of service modules that are configured to provide business support services as a service to other service providers, wherein the plurality of service modules include one or more application programming interfaces that are configured to enable programmatic access to the plurality of service modules by the other service providers; and
      enable the first service provider to provide programmatic access to functions of the plurality of service modules to a second service provider via the one or more application programming interfaces to enable the second service provider to implement a service that the second service provider provides to a customer of the second service provider using one or more of the plurality of service modules;
   wherein the plurality of service modules comprise a profile service module which is configured by the processor to allow the second service provider to register with the first service provider and to allow the second service provider to provide a roles model to define one or more roles related to the service provided by the second service provider, wherein a role of the one or more roles comprises a named set of one or more users who are associated with capabilities that are defined by the second service provider.

23. An article of manufacture for providing support services as a service to a service provider, the article of manufacture comprising a non-transitory computer readable storage medium tangibly embodying a computer readable program code which, when executed, causes the computer to:
   enable a first service provider to maintain a plurality of service modules that are configured to provide business support services as a service to other service providers, wherein the plurality of service modules include one or more application programming interfaces that are configured to enable programmatic access to the plurality of service modules by the other service providers; and
   enable the first service provider to provide programmatic access to functions of the plurality of service modules to a second service provider via the one or more application programming interfaces to enable the second service provider to implement a service that the second service provider provides to a customer of the second service provider using one or more of the plurality of service modules;
   wherein the plurality of service modules comprise a profile service module which is configured to allow the second service provider to register with the first service provider, and to allow the second service provider to provide a roles model to define one or more roles related to the service provided by the second service provider, wherein a role of the one or more roles comprises a named set of one or more users who are associated with capabilities that are defined by the second service provider.

24. A system for providing support services as a service, the system comprising:
   a first service provider configured to maintain a plurality of service modules that are configured to provide business support services as a service to other service providers, wherein the plurality of service modules include one or more application programming interfaces that are configured to enable programmatic access to the plurality of service modules by the other service providers;
   wherein the first service provider is further configured to provide programmatic access to functions of the plurality of service modules to a second service provider via the one or more application programming interfaces to enable the second service provider to implement a service that the second service provider provides to a customer of the second service provider using one or more of the plurality of service modules;
   wherein in maintaining a plurality of service modules, the first service provider is configured to maintain a profile service module which is configured to allow the second service provider to register with the first service provider and to allow the second service provider to provide a roles model to define one or more roles related to the service provided by the second service provider, wherein a role of the one or more roles comprises a named set of one or more users who are associated with capabilities that are defined by the second service provider; and
   one or more processor devices for implementing the plurality of service modules via instruction code operative to be executed by the one or more processor devices.

25. The system of claim 24, further comprising:
   a service invocation layer coupled to the plurality of service modules, wherein the service invocation layer is configured to provide interconnections between user interfaces and application programming interfaces of the plurality of service modules such that an invocation associated with one service module can be programmed to result in a follow-on invocation associated with another service module.

* * * * *